United States Patent
Pelger et al.

(10) Patent No.: US 11,372,430 B2
(45) Date of Patent: Jun. 28, 2022

(54) METHOD FOR OPERATING A VALVE OF A PRESSURE VESSEL SYSTEM, AND PRESSURE VESSEL SYSTEM

(71) Applicant: Bayerische Motoren Werke Aktiengesellschaft, Munich (DE)

(72) Inventors: Andreas Pelger, Ismaning (DE); Stefan Schott, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/277,502

(22) Filed: Feb. 15, 2019

(65) Prior Publication Data

US 2019/0178448 A1 Jun. 13, 2019

Related U.S. Application Data

(63) Continuation of application No. PCT/EP2017/066960, filed on Jul. 6, 2017.

(30) Foreign Application Priority Data

Aug. 17, 2016 (DE) ..................... 10 2016 215 323.4

(51) Int. Cl.
  *G05D 16/00* (2006.01)
  *F17C 13/04* (2006.01)
(52) U.S. Cl.
  CPC ............ *G05D 16/028* (2019.01); *F17C 13/04* (2013.01); *F17C 2250/0434* (2013.01); *F17C 2260/015* (2013.01); *Y10T 137/776* (2015.04)
(58) Field of Classification Search
  CPC .............. F17C 13/04; F17C 2250/0434; F17C 2260/015; Y10T 137/776; Y10T 137/7729; G05D 16/028

USPC .................................................. 137/487, 462
See application file for complete search history.

(56) References Cited

U.S. PATENT DOCUMENTS

| | | | | |
|---|---|---|---|---|
| 2,649,773 A | * | 8/1953 | Griswold | F16K 17/32 137/460 |
| 3,260,062 A | * | 7/1966 | Mitchell | F17C 3/005 62/48.2 |
| 3,858,404 A | * | 1/1975 | Davis | F17C 13/025 62/49.2 |
| 6,021,808 A | * | 2/2000 | Dulac | F24H 9/2035 137/487 |

(Continued)

FOREIGN PATENT DOCUMENTS

| CN | 202017884 U | 10/2011 |
|---|---|---|
| CN | 104729842 A | 6/2015 |

(Continued)

OTHER PUBLICATIONS

PCT/EP2017/066960, International Search Report dated Oct. 5, 2017 (Three (3) pages).

(Continued)

*Primary Examiner* — William M McCalister
(74) *Attorney, Agent, or Firm* — Crowell & Moring LLP

(57) ABSTRACT

A method for operating a valve of a pressure vessel system includes determining an actual pressure difference between an inlet pressure at an inlet of the valve and an outlet pressure at an outlet of the valve, and enabling the valve if the actual pressure difference is lower than or equal to a maximum admissible pressure difference of the valve.

16 Claims, 2 Drawing Sheets

(56) References Cited

U.S. PATENT DOCUMENTS

| | | | | |
|---|---|---|---|---|
| 6,505,470 | B1* | 1/2003 | Drube | F17C 3/00 62/49.2 |
| 7,127,937 | B1* | 10/2006 | Thyroff | H01M 8/04432 73/40.5 R |
| 7,367,349 | B2* | 5/2008 | Thyroff | F17C 7/00 137/14 |
| 7,426,935 | B2 | 9/2008 | Schwan et al. | |
| 9,279,542 | B2* | 3/2016 | Schulze | H01M 8/04753 |
| 2002/0104564 | A1* | 8/2002 | Dulac | F24H 9/126 137/334 |
| 2004/0112435 | A1* | 6/2004 | Olander | G05D 7/0652 137/487.5 |
| 2005/0103382 | A1* | 5/2005 | Carter | F16K 31/406 137/487.5 |
| 2005/0173003 | A1* | 8/2005 | Laverdiere | G05D 16/2013 137/487.5 |
| 2008/0173355 | A1* | 7/2008 | Meckes | B64D 10/00 137/109 |
| 2009/0242043 | A1* | 10/2009 | Lev | H01M 8/04201 137/505.25 |
| 2010/0024901 | A1* | 2/2010 | Sorensen | F16K 17/105 137/487 |
| 2013/0037146 | A1* | 2/2013 | Anagnos | F16K 39/024 137/614.16 |
| 2013/0167603 | A1* | 7/2013 | Bathurst | C10L 1/026 422/112 |
| 2014/0190704 | A1* | 7/2014 | Kucera | F16K 17/10 137/489.5 |
| 2016/0215897 | A1* | 7/2016 | Chow | F17C 13/04 |
| 2017/0030521 | A1* | 2/2017 | Markham | F17C 13/04 |

FOREIGN PATENT DOCUMENTS

| | | |
|---|---|---|
| DE | 37 33 442 A1 | 4/1989 |
| DE | 10 2006 025 125 A1 | 12/2006 |
| DE | 10 2006 031 875 A1 | 2/2007 |
| DE | 10 2005 040 024 A1 | 3/2007 |
| DE | 10 2006 017 541 B4 | 10/2008 |
| DE | 10 2014 103 238 A1 | 10/2015 |
| EP | 1 312 854 A1 | 5/2003 |
| EP | 2 947 361 A1 | 11/2015 |
| WO | WO 2008/119588 A1 | 10/2008 |
| WO | WO 2011/105038 A1 | 9/2011 |

OTHER PUBLICATIONS

German Search Report issued in German counterpart application No. 10 2016 215 323.4 dated Jun. 9, 2017, with Statement of Relevancy (Thirteen (13) pages).

Verordnung (EU) Nr. 406/2010 der Kommission vom Apr. 26, 2010 zur Durchfeuhrung der Verordnung (EG) Nr. 79/2009 des Europaeischen Parlaments und des Rates ueber die Typgenehmigung von wasserstoffbetriebenen Kraftfahrzeugen. In: Amtsblatt der Europaeischen Union, Bd. 53, 2010, H. L122, S. 1-107 (107 total pages).—ISSN 1725-2539.

Chinese Office Action issued in Chinese application No. 201780030313.3 dated Apr. 2, 2020, with English translation (Fifteen (15) pages).

Chinese Office Action issued in Chinese application No. 201780030313.3 dated Dec. 2, 2020, with English translation (Fourteen (14) pages).

* cited by examiner

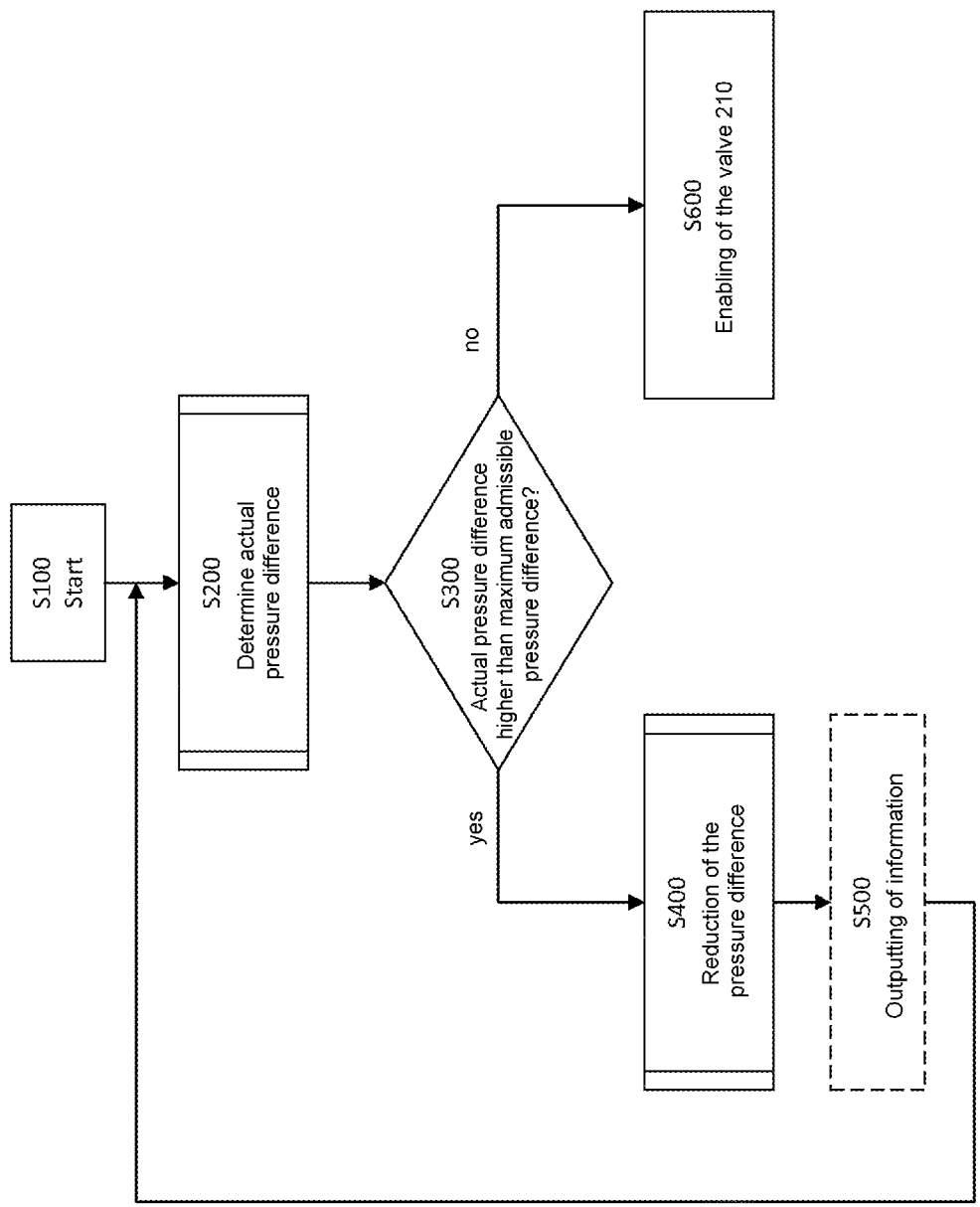

METHOD FOR OPERATING A VALVE OF A PRESSURE VESSEL SYSTEM, AND PRESSURE VESSEL SYSTEM

CROSS REFERENCE TO RELATED APPLICATIONS

This application is a continuation of PCT International Application No. PCT/EP2017/066960, filed Jul. 6, 2017, which claims priority under 35 U.S.C. § 119 from German Patent Application No. 10 2016 215 323.4, filed Aug. 17, 2016, the entire disclosures of which are herein expressly incorporated by reference.

BACKGROUND AND SUMMARY OF THE INVENTION

The technology disclosed here relates to a method for operating a valve of a pressure vessel system, and to a pressure vessel system.

Pressure vessel systems are known per se. For example, high-pressure gas vessel systems and cryogenic pressure vessel systems are used in motor vehicles which are powered using hydrogen. Such pressure vessel systems comprise, inter alia, a tank shut-off valve which is designed to regulate the outflow of fuel from the pressure vessel.

The Commission Regulation (EU) no. 406/2010 of Apr. 26, 2010 on the implementation of Regulation (EC) no. 79/2009 of the European Parliament and of the Council for the type approval of hydrogen-powered motor vehicles prescribes valve tests in which, upon the opening of the valve, the outlet pressure must amount to at least 50% of the inlet pressure. During the operation of the pressure vessel system, a situation may arise in which, after the closing of the tank shut-off valve, fuel continues to be extracted downstream of the tank shut-off valve. This has the effect that the pressure downstream of the tank shut-off valve decreases, and thus the pressure difference between inlet and outlet of the tank shut-off valve increases further. It would thus be possible for a situation to arise in which, upon the opening of the valve, the outlet pressure amounts to less than 50% of the inlet pressure. The valve would then not have been tested and approved for such operating conditions. If the tank shut-off valve were opened in such a situation, it could sustain damage.

The above-cited regulation can be complied with, and damage to the tank shut-off valve prevented, by virtue of the tank shut-off valve being designed to be correspondingly robust. For this purpose, provision may be made for the tank shut-off valve to be designed for a maximum operating pressure twice as high as the nominal operating pressure of the pressure vessel. Such tank shut-off valves would then however be relatively expensive and/or would require a relatively large amount of structural space.

A preferred object of the technology disclosed here is that of reducing or eliminating at least one disadvantage of the previously known solutions. In particular, it is a preferred object of the technology disclosed here to provide an operationally reliable valve which requires relatively little structural space, is relatively lightweight and/or is relatively inexpensive. Further preferred objects may arise from the advantageous effects of the technology disclosed here. The object(s) is/are achieved by means of the subject matter of the independent patent claims. The dependent claims constitute preferred refinements.

The technology disclosed here relates to a pressure vessel system for a motor vehicle. The pressure vessel system serves for storing fuel which is gaseous under ambient conditions. The pressure vessel system may for example be used in a motor vehicle which is powered using compressed ("compressed natural gas", CNG) or liquefied (LNG) natural gas or using hydrogen.

A pressure vessel system of said type comprises at least one pressure vessel. The pressure vessel may for example be a cryogenic pressure vessel (CcH2) or a high-pressure gas vessel (CGH2).

High-pressure gas vessels are designed to, substantially at ambient temperatures, permanently store fuel at a nominal operating pressure (also referred to as nominal working pressure or NWP) of over approximately 350 barg (positive pressure in relation to atmospheric pressure), furthermore preferably of over approximately 500 barg and particularly preferably of over approximately 700 barg. A cryogenic pressure vessel is suitable for storing the fuel at the above-mentioned operating pressures even in the presence of temperatures which lie considerably below the operating temperature of the motor vehicle.

The pressure vessel system disclosed here furthermore comprises at least one valve which is fluidically connected to the at least one pressure vessel. Preferably, the at least one valve is a tank shut-off valve (TAV, or shut-off valve). The tank shut-off valve is the valve whose inlet pressure (substantially) corresponds to the vessel pressure. The tank shut-off valve is in particular a controllable or regulatable valve, and is in particular a valve which is closed when electrically de-energized. The tank shut-off valve is generally integrated into an on-tank valve (OTV). The on-tank valve is the valve unit that is installed directly on one end of the pressure vessel and which is directly fluidically connected to the interior of the pressure vessel. In the Commission Regulation (EU) no. 406/2010 of Apr. 26, 2010 on the implementation of Regulation (EC) no. 79/2009 of the European Parliament and of the Council for the type approval of hydrogen-powered motor vehicles, a tank shut-off valve of said type is also referred to as first valve.

The pressure vessel system disclosed here may furthermore comprise at least one pressure sensor which is arranged downstream of the valve. The pressure sensor is expediently designed to measure the pressure of the fuel at the outlet of the valve.

The pressure vessel system disclosed here may furthermore comprise at least one control unit which is designed to regulate or control at least some of the components of the pressure vessel system. In particular, the control unit may be designed to carry out the method steps disclosed here. The control unit may be designed to enable the valve if the value of the actual pressure difference is lower than or equal to the maximum admissible pressure difference of the valve.

The maximum admissible pressure difference is in this case the pressure difference between the inlet and the outlet of the valve at which the valve can still just be operated. If the regulation cited in the introduction is relevant, said pressure difference amounts to for example at most 50% (that is to say, the outlet pressure may be at most 50% lower than the inlet pressure of the valve).

It is thus possible for a safety function to be stored in the control unit. The safety function ensures that the valve can be actuated only if the actual pressure difference is lower than the maximum admissible pressure difference of the valve. It is thus possible to use relatively lightweight and space-saving valves.

The valve of the pressure vessel system disclosed here may in particular be a pilot-controlled valve which has a pilot control seat and a main seat. Such pilot-controlled or indirect valves are known. It is the object of the pilot-controlling actuating element (for example magnet coil, lever, foot switch, . . . ) to open and close only a small pilot control bore of the pilot control seat. The task itself, the movement of the main piston, is then performed by the fuel. The control unit may be designed to open the control seat in order to reduce the actual pressure difference. The pilot control seat has a smaller opening cross section than the main seat. Relatively small forces and moments arise at such an opening cross section, which may be non-critical even in the presence of high pressure differences. The opening of the pilot control seat however already effects a certain pressure equalization, which has the effect that the actual pressure difference decreases. The pilot control valve may, for this purpose, be adjusted by means of a suitable adjuster, for example by means of pulse width modulation. The pilot control may also be merely one pulse—which is possibly repeated until the desired pressure increase occurs (downstream of the valve).

The pressure vessel system disclosed here may furthermore have a bypass valve. The bypass valve may branch off upstream from the (main) valve or begin directly in the pressure vessel, and open out downstream of the valve. In other words, the bypass valve is thus arranged fluidically in parallel with respect to the valve. The bypass valve itself is preferably dimensioned so as to have relatively small throughflow cross sections in relation to the valve. For example, the maximum mass flow of fuel through the bypass valve may be lower, at least by a factor of 10, preferably by a factor of 100 or 1000, than the maximum mass flow of fuel through the valve. Aside from the different maximum mass flow, the bypass valve may otherwise be of identical construction to the valve. Preferably, the control unit may be designed to open the bypass valve for the purposes of the pressure equalization, in particular if the actual pressure difference is higher than the maximum admissible pressure difference. Provision may however also be made for the bypass valve to be manually actuated, for example by means of correspondingly trained servicing personnel. Such a bypass valve, owing to the relatively small flow cross sections, is less expensive, smaller and lighter than the valve. Said valve may preferably be designed for much higher pressure differences than the valve.

The pressure vessel system disclosed here may furthermore have a pressure relief device, which may be arranged upstream of or fluidically in parallel with respect to the valve, in particular with respect to the tank shut-off valve. The pressure relief device may be designed to discharge fuel in order to reduce the actual pressure difference. It is preferably a reversibly re-sealable pressure relief device. A pressure relief device may for example be a bleed port which is arranged fluidically between the tank shut-off valve and the pressure vessel. Such a bleed port may expediently be a mechanically actuatable valve. Other solutions are however also conceivable.

The pressure vessel system disclosed here may comprise at least one replenishment line which is fluidically connected to the outlet of the valve such that the pressure downstream of the valve can be increased by means of a replenishment process via the replenishment line. It is thus expediently possible for the pressure at the outlet of the valve to be increased, whereby the actual pressure difference decreases.

Alternatively or in addition, the pressure vessel system disclosed here may have at least one service port. A service port of said type may be provided for example in the anode subsystem. It may for example serve for the supply and/or discharge of fuel. A service port of said type may expediently be arranged in the medium-pressure region. The service port preferably has a different coupling than the replenishment coupling of the replenishment line. The risk of misuse can thus be reduced.

The pressure vessel system may comprise further components of an anode subsystem of a fuel cell system. The anode subsystem is formed from the fuel-conducting components. An anode subsystem may have the at least one pressure vessel, the at least one valve, at least one pressure reducer, at least one anode feed line leading to the anode inlet, an anode chamber in the fuel cell stack, at least one anode waste-gas line leading away from the anode outlet, at least one water separator (AWS), at least one purge valve (APV), at least one active or passive fuel recirculation pump (ARE or ARB) and/or at least one recirculation line and further elements. It is the main objective of the anode subsystem to admit and distribute fuel onto the electrochemically active surfaces of the anode chamber and to discharge anode waste gas.

The technology disclosed here furthermore relates to a method for operating the valve of the pressure vessel system disclosed here. The method comprises the steps:
  determining the actual pressure difference between the inlet pressure $p_E$ at the inlet of the valve and the outlet pressure ($p_A$) at the outlet of the valve; and
  enabling the valve if the value of the actual pressure difference is lower than or equal to a maximum admissible pressure difference of the valve.

The method may comprise the step wherein, before the opening-up of the valve, the actual pressure difference is reduced to a value below the maximum admissible pressure difference, in particular without the valve or a main seat of the valve being opened in the process.

The method may furthermore comprise the step wherein, for the reduction of the actual pressure difference to a value below the maximum admissible pressure difference, the method comprises at least one of the following steps:
  opening the pilot control seat of the valve;
  opening the bypass valve, which branches off upstream of the valve and opens out downstream of the valve;
  relieving the fuel line upstream of the valve of pressure; and/or
  increasing the pressure in the fuel line downstream of the valve.

In one refinement, the actual pressure difference may be determined by virtue of the pressure values at the inlet and at the outlet of the valve being measured.

The pressure at the inlet of the valve is preferably determined by means of the following method:
  determining the inlet pressure $p_{E1}$ and the temperature $T_1$ of the fuel at a first time $t_1$, wherein the first time $t_1$ is a preceding time at which the valve was most recently open, wherein the inlet pressure is determined, when the valve is open, by means of a pressure sensor downstream of the valve, wherein the pressure loss at the valve itself is possibly also taken into consideration, and wherein the values determined at the first time are possibly stored;
  measuring the present actual inlet pressure $p_{Eist}$ at a time at which the valve or the main seat of the valve is closed and is possibly to be opened;
  comparing the present actual inlet pressure $p_{Eist}$ with the inlet pressure $p_{E1}$ at a first time $t_1$, in particular by virtue of one value being subtracted from the other value.

In the determination of the pressure difference in accordance with this method, it is preferably possible for a safety factor to be added, which allows for the fact that the pressure values at the inlet have been calculated, not measured.

The method disclosed here may furthermore comprise the step wherein a user of the pressure vessel system or of the motor vehicle or a servicing facility (for example workshop, distributor, etc.) is informed that a malfunction of the valve is present. For this purpose, use may be made of any type of information display, and any suitable text may be used.

The operating method may furthermore comprise the step: closing the at least one valve in the anode subsystem before the fuel consumption (that is to say fuel conversion) downstream of the valve has been stopped (in particular the pressure reduction by means of the at least one pressure reducer, the electrochemical reaction of the at least one fuel cell and/or the operation of the anode ventilation valve, etc.), such that a pressure difference (preferably a setpoint pressure difference) for the closed valve takes effect between the outlet and the inlet of the valve. Such a setpoint pressure difference may be utilized for example for diagnostic purposes, for example for a leak-tightness check.

In other words, the technology disclosed here relates to a pressure vessel system and to a method for operating a tank shut-off valve, in the case of which the pressure in both regions is detected (by means of corresponding sensors) or the pressure in one of the two regions is detected and, during the shut-down process of the vehicle (or upon the stoppage of the extraction), the pressure in the non-detected region is noted. This is possible because, in the extraction mode, the valve is in the open position and, upon the activation process (prior to the opening of the valve), the noted pressure can be compared with the measured pressure. It is preferable here for a safety factor to be taken into consideration, because temperature changes in the enclosed volume can lead to a pressure change. As an alternative to the safety factor, consideration may be given to a calculation (temperature and volume are known upon shut-down and starting) of the present pressure in the corresponding volumes.

If the deviation is greater than 50% (including any safety factors), the extraction is blocked, that is to say the valve is not activated). Only by means of at least partial pressure equalization, in particular by means of the filling of the high-pressure line downstream of the shut-off valve, is the extraction enabled again. This may be realized either by means of a replenishment process (in this case, the high-pressure line is also pressurized) or by means of an access point provided specifically for the purpose (for example service port on the high-pressure line). It would theoretically also be possible for a "bypass valve" on the tank system to produce this pressure equalization (could be manually or automatically activatable). Said valve could be of correspondingly simple construction, because it does not need to switch high mass flows (such as are required during the extraction). It is alternatively preferably also possible, in the case of a pilot-controlled valve, for the pilot control seat to be briefly activated, possibly several times, and thus for a pressure equalization to be produced without the main seat being opened.

Loading of the valve beyond the design limit is prevented. Thus, component protection is effectively ensured using simple means. It would theoretically be possible to always design a valve in this way (or else for smaller pressure differences) and thus for the valves to be of simpler (less robust) construction, and/or for wear to be reduced. A method is proposed which monitors whether an admissible pressure difference prevails at the shut-off valve. The method opens up the shut-off valve only if the pressure difference lies in the admissible range.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 depicts one embodiment of a process for operating the pressure vessel system of FIG. 1.

DETAILED DESCRIPTION OF THE DRAWINGS

Figure 1:
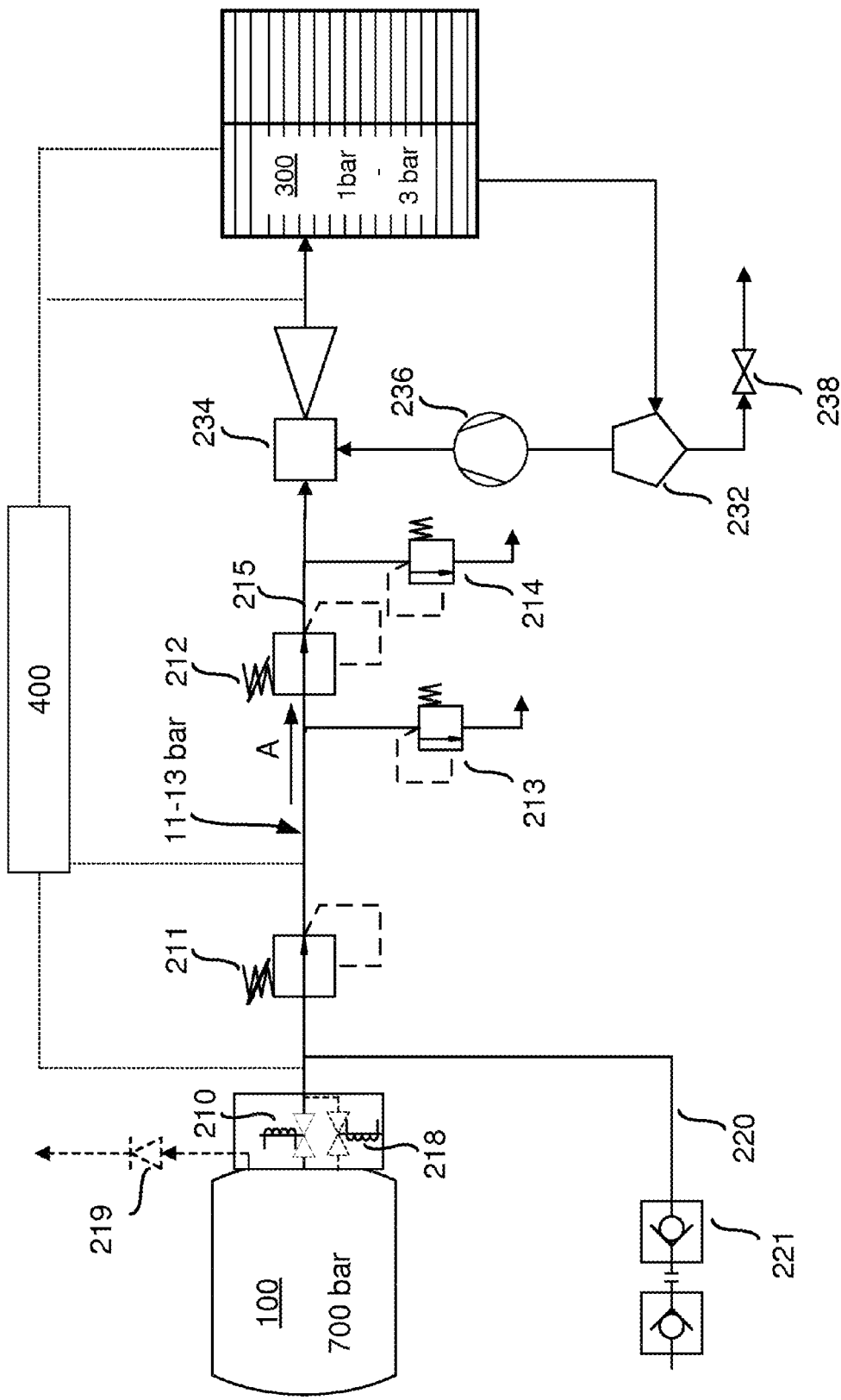
FIG. 1 schematically depicts one embodiment of a pressure vessel system configured in accordance with the principles of the invention.

FIG. 1 schematically shows the pressure vessel system disclosed here. In the pressure vessel 100, fuel is stored, for example hydrogen at 700 bar. The pressure vessel 100 provides hydrogen for a fuel cell stack with a multiplicity of fuel cells 300, which are operated at a relatively low pressure level, for example 0 to 2 barg (positive pressure in relation to atmospheric pressure). At one end of the pressure vessel 100, there is provided a tank shut-off valve 210. Instead of only one pressure vessel 100 with a tank shut-off valve 210, it would likewise be possible for multiple pressure vessels 100 with multiple tank shut-off valves 210 to be provided. In the system illustrated here, there are furthermore provided two pressure stages which each operate with a pressure reducer 211, 212. The first pressure stage lowers the pressure from 700 bar to a medium pressure level of for example 11 to 13 bar (medium pressure region). The second pressure stage lowers the pressure from the medium pressure to the low pressure of the fuel cells. To prevent inadmissible loading of the pipelines in the event of a malfunction of the pressure reducers 211, 212, in each case one pressure relief valve 213, 214 is provided on the low-pressure side. During the replenishment of the pressure vessel system, fuel flows through the replenishment coupling 221 and the replenishment line 220 into the pressure vessel 100. The replenishment line 220 is connected to the outlet of the tank shut-off valve 210. If an excessively large actual pressure difference between inlet and outlet of the tank shut-off valve 210 has now been detected by the controller 400, then a user or trained service personnel can increase the pressure in the anode subsystem, for example by pressurizing the replenishment line 220 and/or the anode feed line 215. For this purpose, the replenishment coupling 221 or a service port (not shown here) may be utilized. Dashed lines are used to show a bleed port 219. Said bleed port 219 likewise opens out in the pressure vessel 100, and is thus arranged fluidically in parallel with respect to the tank shut-off valve 210. Here, the bleed port 219 may be manually actuated, such that the pressure in the pressure vessel 100 can be reduced by means of said bleed port 219. The pressure relief unit disclosed here however does not need to be designed as a bleed port 219.

Alternatively or in addition to the bleed port 219, it is furthermore possible for a bypass valve 218 to be provided, which is in this case electrically actuated.

The components shown here with the reference designations 100, 210, 211, 212, 213, 214, 215, 218, 219, 220, 221, 232, 234, 236, 238 (and in part) 300 are constituent parts of the anode subsystem A. The flow direction of the fuel is illustrated here by an arrow.

The method disclosed here will now be discussed on the basis of FIG. 2. The method starts with the step S100. Firstly, the actual pressure difference between the inlet and the outlet of the valve is directly or indirectly determined. For this purpose, both pressure values may be measured. It is preferable for only pressure values downstream of the valves to be measured, from which the values at the inlet are then calculated. In the step 300, the actual pressure difference is then compared with the maximum admissible pressure difference of the valve 210. If the actual pressure difference is greater than the maximum admissible pressure difference, then in the step S400, the pressure difference is reduced, for example by virtue of the anode subsystem being pressurized downstream of the valve 210 and/or by virtue of fuel being discharged from the at least one pressure vessel 100. In the step S500, an output to a user of the motor vehicle or else to a servicing facility may be performed. Subsequently, the step S200 is performed again. If the actual pressure difference is lower than the maximum admissible pressure difference, then the valve 210 can be enabled. The valve 210 may then be opened or continue to be operated. The control unit 400 is designed to carry out the abovementioned steps.

For the sake of legibility, the expression "at least one" has, in part, been omitted for the sake of simplicity. If a feature of the technology disclosed here is described in the singular or indeterminate (for example the/a pressure vessel, the/a valve, the/a bypass valve etc.), the disclosure is simultaneously also intended to encompass the plural thereof (for example the at least one pressure vessel, the at least one valve, the at least one bypass valve etc.).

The above description of the present invention serves merely for illustrative purposes and not for the purposes of limiting the invention. In the context of the invention, numerous changes and modifications are possible without departing from the scope of the invention and its equivalents.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a valve of a pressure vessel system of a motor vehicle, wherein the pressure vessel system includes a pressure vessel that is a cryogenic pressure vessel or a high-pressure gas vessel, wherein the valve is fluidically connected to the pressure vessel, wherein the pressure vessel system includes a control unit, wherein a safety function is stored in the control unit, and wherein the safety function ensures that the valve can be actuated only if an actual pressure difference between an inlet pressure at an inlet of the valve and an outlet pressure at an outlet of the valve is in a range of 0% to 50% inclusive, comprising the steps:
   determining the actual pressure difference; and
   enabling the valve by the control unit when the actual pressure difference is in the range of 0% to 50% inclusive, wherein the range is a design limit of the valve that is not to be exceeded.

2. The method as claimed in claim 1, further comprising reducing, before opening of the valve, the actual pressure difference.

3. The method as claimed in claim 2, wherein reducing the actual pressure difference comprises at least one of:
   opening a pilot control seat of the valve;
   opening a bypass valve;
   relieving pressure in a fuel line upstream of the valve; and
   increasing pressure in the fuel line downstream of the valve.

4. A method for operating a valve of a pressure vessel system, comprising the steps:
   determining an actual pressure difference between an inlet pressure at an inlet of the valve and an outlet pressure at an outlet of the valve;
   opening the valve only if the actual pressure difference is lower than or equal to a maximum admissible pressure difference of the valve, wherein the maximum admissible pressure difference of the valve is a design limit of the valve that is not to be exceeded; and
   determining the inlet pressure at the inlet of the valve by:
      determining an inlet pressure of a fuel and a temperature of the fuel at the inlet at a first time, wherein the first time is a time at which the valve was most recently open;
      measuring a present actual inlet pressure at a second time at which the valve is closed;
      comparing the present actual inlet pressure at the second time with the inlet pressure at the first time.

5. The method as claimed in claim 2 further comprising the step of:
   determining the inlet pressure at the inlet of the valve by:
      determining an inlet pressure of a fuel and a temperature of the fuel at the inlet at a first time, wherein the first time is a time at which the valve was most recently open;
      measuring a present actual inlet pressure at a second time at which the valve is closed;
      comparing the present actual inlet pressure at the second time with the inlet pressure at the first time.

6. The method as claimed in claim 3 further comprising the step of:
   determining the inlet pressure at the inlet of the valve by:
      determining an inlet pressure of a fuel and a temperature of the fuel at the inlet at a first time, wherein the first time is a time at which the valve was most recently open;
      measuring a present actual inlet pressure at a second time at which the valve is closed;
      comparing the present actual inlet pressure at the second time with the inlet pressure at the first time.

7. A pressure vessel system of a motor vehicle, comprising:
   a pressure vessel that is a cryogenic pressure vessel or a high-pressure gas vessel configured to store fuel;
   a valve fluidically connected to the pressure vessel; and
   a control unit,
   wherein the control unit is configured to determine an actual pressure difference between an inlet pressure at an inlet of the valve and an outlet pressure at an outlet of the valve, and
   wherein a safety function is stored in the control unit and wherein the safety function ensures that the valve can be actuated only if the actual pressure difference is in a range of 0% to 50% inclusive, wherein the range is a design limit of the valve that is not to be exceeded.

8. The pressure vessel system as claimed in claim 7, wherein the valve is a pilot-controlled valve.

9. The pressure vessel system as claimed in claim 7, further comprising a bypass valve in relation to the valve.

10. The pressure vessel system as claimed in claim 8, further comprising a bypass valve in relation to the valve.

11. The pressure vessel system as claimed in claim 7, further comprising a pressure relief device arranged upstream of or fluidically in parallel with respect to the valve, wherein the pressure relief device is configured to discharge fuel to reduce the actual pressure difference.

12. The pressure vessel system as claimed in claim 8, further comprising a pressure relief device arranged upstream of or fluidically in parallel with respect to the valve, wherein the pressure relief device is configured to discharge fuel to reduce the actual pressure difference.

13. The pressure vessel system as claimed in claim 9, further comprising a pressure relief device arranged upstream of or fluidically in parallel with respect to the valve, wherein the pressure relief device is configured to discharge fuel to reduce the actual pressure difference.

14. The pressure vessel system as claimed in claim 7, further comprising at least one replenishment line fluidically connected to the outlet of the valve such that the pressure downstream of the valve can be increased.

15. The pressure vessel system as claimed in claim 8, further comprising at least one replenishment line fluidically connected to the outlet of the valve such that the pressure downstream of the valve can be increased.

16. The pressure vessel system as claimed in claim 11, further comprising at least one replenishment line fluidically connected to the outlet of the valve such that the pressure downstream of the valve can be increased.

* * * * *